O. W. KELLEN.
WHEEL AND PULLEY REMOVER.
APPLICATION FILED JAN. 21, 1919.

1,367,816. Patented Feb. 8, 1921.

WITNESSES

INVENTOR
O. W. Kellen
BY
ATTORNEYS

UNITED STATES PATENT OFFICE.

ORVILLE WARREN KELLEN, OF FAIRBANKS, TERRITORY OF ALASKA.

WHEEL AND PULLEY REMOVER.

1,367,816.  Specification of Letters Patent.  Patented Feb. 8, 1921.

Application filed January 21, 1919. Serial No. 272,342.

*To all whom it may concern:*

Be it known that I, ORVILLE W. KELLEN, a citizen of the United States, and a resident of Fairbanks, Territory of Alaska, have invented a new and Improved Wheel and Pulley Remover, of which the following is a full, clear, and exact description.

This invention relates to devices for removing wheels of different kinds and has for an object the provision of an improved construction whereby a wrench or other small instrument may be used to quickly and easily remove a wheel.

Another object of the invention is to provide a hub and a plurality of coacting nuts whereby on the operation of the nuts the hub will be gradually forced from its supporting axle.

Another object in view is to provide a removing device for wheels keyed or otherwise locked to live-axles or shafts which latter is carried with the wheel and will permit the proper operation of the wheel, and which may be quickly and easily operated for removing the wheel at any time.

Figure 1:
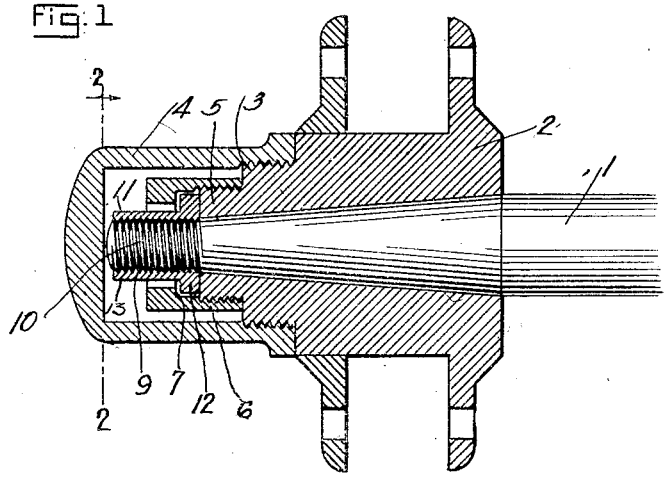
Figure 1 is a longitudinal vertical section through the hub of a wheel showing an embodiment of the invention.
Figure 2:
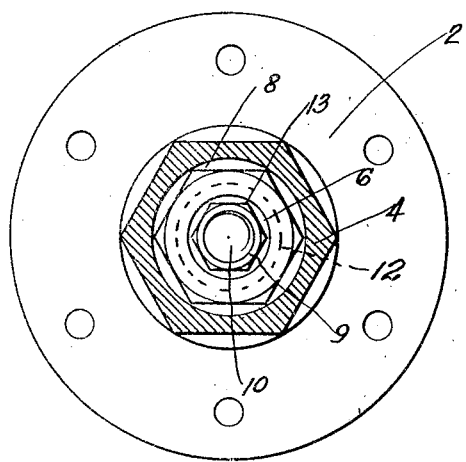
Fig. 2 is a transverse section through Fig. 1 on line 2—2.

Referring to the accompanying drawing by numerals 1 indicates an axle of any desired kind, as for instance a live-axle, to which the hub 2 may be secured in any desired way, as for instance by a key. The hub 2 may be the hub of any desired wheel, as for instance an automobile wheel which is fastened to the axle 1, which axle may be a live-axle or merely an ordinary supporting axle. Where the hub is connected with a live-axle it is keyed or otherwise rigidly secured in place and consequently when it is desired to remove the same more or less difficulty is experienced. In constructing the parts according to the present invention the hub 2 is provided with a threaded section 3 for receiving the cap 4, and is provided with a threaded section 5 for receiving the hub-nut 6, said hub-nut being in the form of a sleeve having an overhanging shoulder 7 and a squared portion 8 in the upper part for receiving a wrench. An axle nut 9 is screwed on to the threaded section 10 of axle 1 so as to prevent the accidental removal of the hub 2. The nut 9 is preferably formed with a tubular section 11 and a flanged or shouldered portion 12 underlapping the shoulder 7 so that when a wrench is applied to the squared part 13 of the nut 9 the flange or shoulder 12 will press against the shoulder 7, and as the hub-nut 6 is threaded on to extension 5 the hub will be pulled from axle 1. The pulling action may be continued until the nut 9 has been entirely removed from the threaded section 10. This will properly loosen up the hub 2 as the same fits on to a tapering section of the axle 1. In case there is no taper the movement for a short distance would usually provide a sufficient moving effect to allow the wheel to be removed manually. However, in view of the cam action of the threads on section 10 and the nut 9 the initial pull against the hub is comparatively great with the exercise of a comparatively small instrument, which though small, by this means starts the hub from its usual correct place.

What I claim is:

In a wheel remover the combination with a wheel provided with a hub adapted to fit on a live axle so as to be driven thereby, said hub being provided with a pair of offset threaded extensions of different diameters, in an axle nut adapted to be threaded on to said axle, said axle nut having a flange adjacent the end of the hub and a squared extension designed to receive a wrench, a hub nut threaded on to the lesser of said hub threaded extensions, said hub nut having an inwardly extending flange overlapping the flange of the axle nut whereby when the axle nut is unscrewed the flange will contact and consequently the hub will be pulled off the axle, and a protecting cap fitting over both of said nuts and threaded on to the threaded extension having the greater diameter.

ORVILLE WARREN KELLEN.